(12) United States Patent
Mukainakano (10) Patent No.: US 12,515,558 B2
(45) Date of Patent: Jan. 6, 2026

(54) VEHICLE AND RECORDING MEDIUM (71) Applicant: SUBARU CORPORATION, Tokyo (JP)

(72) Inventor: Yuya Mukainakano, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 157 days.

(21) Appl. No.: 18/582,744

(22) Filed: Feb. 21, 2024

(65) Prior Publication Data

US 2024/0190295 A1 Jun. 13, 2024

Related U.S. Application Data

(63) Continuation of application No. PCT/JP2022/037455, filed on Oct. 6, 2022.

(51) Int. Cl.
*B60L 58/20* (2019.01)
*B60L 58/22* (2019.01)

(52) U.S. Cl.
CPC .............. *B60L 58/20* (2019.02); *B60L 58/22* (2019.02); *B60L 2240/12* (2013.01); *B60L 2240/14* (2013.01); *B60L 2240/36* (2013.01)

(58) Field of Classification Search
CPC ...... B60L 58/20; B60L 58/22; B60L 2240/12; B60L 2240/14; B60L 2240/36
USPC ....................................................... 307/10.1
See application file for complete search history.

(56) References Cited

U.S. PATENT DOCUMENTS

2016/0347183 A1\* 12/2016 Kusumi ............... H01M 50/209
2017/0088009 A1 3/2017 Takizawa et al.

FOREIGN PATENT DOCUMENTS

| JP | H0833120 A | 2/1996 |
|---|---|---|
| JP | 2011-030308 A | 2/2011 |
| JP | 2014-155297 A | 8/2014 |
| JP | 2014-230448 A | 12/2014 |
| JP | 2016-31879 A | 3/2016 |
| JP | 2017-070078 A | 4/2017 |

\* cited by examiner

*Primary Examiner* — Daniel Kessie
*Assistant Examiner* — Dru M Parries
(74) *Attorney, Agent, or Firm* — Rimon P.C.

(57) ABSTRACT

A vehicle includes a vehicle drive power storage device including a power battery pack and a first capacity battery pack and a second capacity battery pack that has at least a smaller capacity than the first capacity battery pack and supplies electric power to the power battery pack. The power battery pack and the capacity battery packs are coupled in parallel. The capacity battery packs have a higher capacity and lower power than the power battery pack. The vehicle further includes a switch mechanism, a control device, and a load. The control device: preferentially supplies electric power from the power battery pack to the load when the vehicle accelerates; and, when a velocity of the vehicle is constant, supplies electric power from the second capacity battery pack to the power battery pack, concurrently with supplying electric power from the first capacity battery pack to the load.

6 Claims, 7 Drawing Sheets

VEHICLE AND RECORDING MEDIUM

CROSS-REFERENCE TO RELATED APPLICATIONS

This application is continuation of International Application No. PCT/JP2022/037455, filed on Oct. 6, 2022, the entire contents of which are hereby incorporated by reference.

BACKGROUND

Technical Field

The disclosure relates to a vehicle drive power storage device, a vehicle equipped with the vehicle drive power storage device, a recording medium, and the like. In the vehicle drive power storage device, a power battery pack and at least two capacity battery packs including a first capacity battery pack and a second capacity battery pack are coupled in parallel. The at least two capacity battery packs have a higher capacity and lower power than the power battery pack.

Related Art

As a chargeable and dischargeable electricity storage device installed in a vehicle, for example, a non-aqueous electrolyte secondary battery (hereinafter also simply referred to as a "non-aqueous secondary battery") is known. A lithium ion secondary battery as an example of the non-aqueous secondary battery can achieve a very high energy density and thus has been developed for in-vehicle use. A battery for in-vehicle use has high power and a high capacity at high levels to cope with various traveling conditions.

For example, Japanese Unexamined Patent Application Publication (JP-A) No. 2011-030308, JP-A No. 2017-070078, and JP-A No. 2014-155297 disclose a vehicle. The vehicle includes, as an in-vehicle power supply, a large-capacity electricity storage device (also referred to as a "capacity battery pack") in which importance is relatively placed on capacity, and a high-power electricity storage device (also referred to as a "power battery pack") in which importance is relatively placed on power. In particular, JP-A No. 2014-155297 proposes that the capacity battery pack and the power battery pack are configured in parallel, and that electric power is supplied from the power battery pack when a large driving force is used, for example, at a time of acceleration or driving up a hill.

SUMMARY

An aspect of the disclosure provides a vehicle including a vehicle drive power storage device including a power battery pack and at least two capacity battery packs including a first capacity battery pack and a second capacity battery pack. The power battery pack and the at least two capacity battery packs are coupled in parallel. The at least two capacity battery packs have a higher capacity and lower power than the power battery pack. The vehicle further includes a switch mechanism configured to switch a coupling state of the vehicle drive power storage device, a control device configured to control charging and discharging of the vehicle drive power storage device via the switch mechanism, and a load configured to be driven and controlled by the control device. The second capacity battery pack is configured to have at least a smaller capacity than the first capacity battery pack and exclusively supply electric power to the power battery pack without supplying electric power to the load. The control device is configured to: (a) preferentially supply electric power from the power battery pack to the load when the vehicle accelerates, and (b) when a velocity of the vehicle is constant, exclusively supply electric power from the second capacity battery pack to the power battery pack without supplying electric power from the second capacity battery pack to the load, concurrently with supplying electric power from the first capacity battery pack to the load.

An aspect of the disclosure provides a recording medium storing a computer program applied to a vehicle drive power storage device including a power battery pack and at least two capacity battery packs including a first capacity battery pack and a second capacity battery pack. The power battery pack and the at least two capacity battery packs are installed in a vehicle and coupled in parallel. The at least two capacity battery packs have a higher capacity and lower power than the power battery pack. The second capacity battery pack is configured to have at least a smaller capacity than the first capacity battery pack and exclusively supply electric power to the power battery pack without supplying electric power to a load. The computer program causes one or more processors to perform processing including acquiring one or both of a velocity and an acceleration of the vehicle, preferentially supplying electric power from the power battery pack to the load when the vehicle accelerates, and when the velocity of the vehicle is constant, exclusively supplying electric power from the second capacity battery pack to the power battery pack without supplying electric power from the second capacity battery pack to the load, concurrently with supplying electric power from the first capacity battery pack to the load.

An aspect of the disclosure provides a vehicle including a vehicle drive power storage device including a power battery pack and at least two capacity battery packs including a first capacity battery pack and a second capacity battery pack. The power battery pack and the at least two capacity battery packs are coupled in parallel. The at least two capacity battery packs have a higher capacity and lower power than the power battery pack. The vehicle further includes a switch mechanism configured to switch a coupling state of the vehicle drive power storage device, circuitry configured to control charging and discharging of the vehicle drive power storage device via the switch mechanism, and a load configured to be driven and controlled by the control device. The second capacity battery pack is configured to have at least a smaller capacity than the first capacity battery pack and exclusively supply electric power to the power battery pack without supplying electric power to the load. The circuitry is configured to: (a) preferentially supply electric power from the power battery pack to the load when the vehicle accelerates, and (b) when a velocity of the vehicle is constant, exclusively supply electric power from the second capacity battery pack to the power battery pack without supplying electric power from the second capacity battery pack to the load, concurrently with supplying electric power from the first capacity battery pack to the load.

BRIEF DESCRIPTION OF THE DRAWINGS

The accompanying drawings are included to provide a further understanding of the disclosure and are incorporated in and constitute a part of this specification. The drawings

DETAILED DESCRIPTION

The related art including JP-A No. 2011-030308, JP-A No. 2017-070078, and JP-A No. 2014-155297 has not yet satisfied market needs and still has the following problem. The in-vehicle electricity storage system disclosed in each of JP-A No. 2011-030308, JP-A No. 2017-070078, and JP-A No. 2014-155297 can cope with various traveling conditions by supplying electric power from a power battery pack when high power is used for a load such as an electric motor. However, the in-vehicle electricity storage system disclosed in each of JP-A No. 2011-030308, JP-A No. 2017-070078, and JP-A No. 2014-155297 still has much room for improvement. For example, in a travel environment in which the vehicle frequently repeatedly accelerates, electric power of the power battery pack decreases and is exhausted first.

It is desirable to provide a vehicle drive power storage device, a vehicle including the vehicle drive power storage device, and a recording medium storing a computer program, where the vehicle drive power storage device can achieve stable battery output by coupling a relatively high-power battery and a relatively high-capacity battery in parallel.

A preferred embodiment of the disclosure will be described in detail below with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. In addition, configurations other than configurations described in detail below may be achieved by appropriately applying known technologies and vehicle configurations including those of JP-A No. 2011-030308, JP-A No. 2017-070078, and JP-A No. 2014-155297, for example.

1-1. Vehicle Drive Power Storage Device

Figure 1:
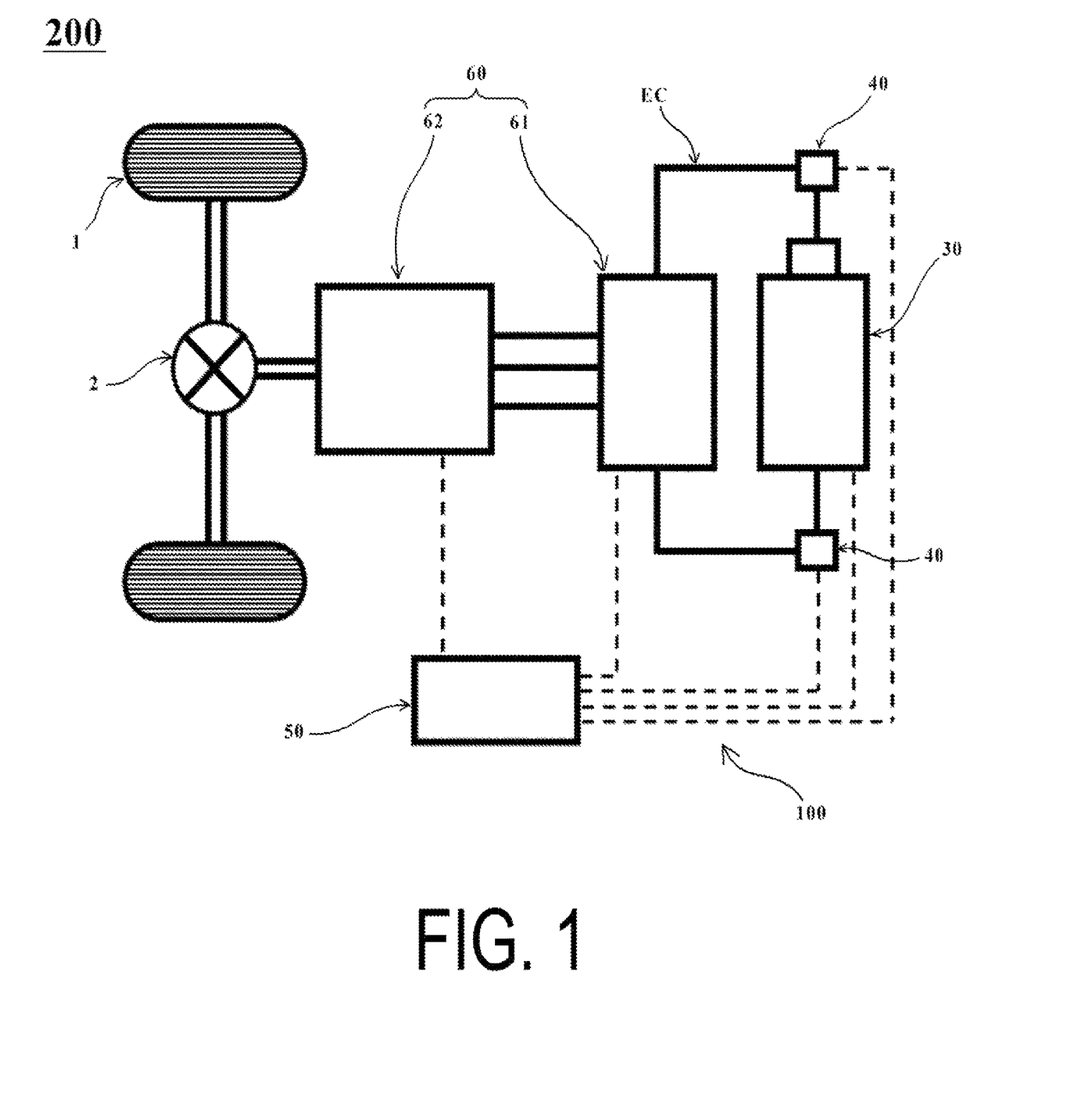
FIG. 1 is a schematic diagram illustrating a configuration example of a vehicle including a vehicle drive power storage device according to an embodiment of the disclosure.

Configuration examples of a vehicle 200 and an in-vehicle electricity storage system 100 including a vehicle drive power storage device 30 according to the embodiment of the disclosure will be described with reference to FIG. 1 to FIG. 5. FIG. 1 is a schematic diagram illustrating the vehicle 200 equipped with the in-vehicle electricity storage system 100. A battery electric vehicle (BEV) equipped with an electric motor will be described below as an example of the "vehicle". However, the vehicle according to the present embodiment may be a hybrid electric vehicle (HEV) that further includes a known engine (internal combustion engine) or an electric vehicle equipped with another known power generation device such as a gas turbine.

As illustrated in FIG. 1, the vehicle 200 according to the present embodiment is equipped with a load 60 that supplies a driving force to wheels 1 serving as drive wheels via a known power transmission mechanism 2 including a differential gear. Hereinafter, a front-wheel drive vehicle (FWD) in which a driving force is supplied from the load 60 to front wheels of the wheels 1 will be described as an example. However, the present embodiment is not limited to the above form. The vehicle may be a rear-wheel drive vehicle (RWD) in which a driving force is supplied to rear wheels or an all-wheel drive vehicle (AWD) in which a driving force is supplied to all the wheels. Additionally, the vehicle 200 according to the embodiment of the disclosure may be, for example, an in-wheel motor electric vehicle in which electric motors are individually mounted at the wheels 1.

The load 60 can be driven and controlled by a vehicle drive control device 70, for example. The load 60 includes a known inverter 61 supplied with electric power from the vehicle drive power storage device 30 and a known electric motor 62, for example, an electric motor that is coupled to the inverter 61 and supplies a driving force to the wheels 1. As illustrated in the drawing, the load 60 according to the present embodiment is electrically coupled to the vehicle drive power storage device 30 serving as an in-vehicle power supply via a switch mechanism 40 capable of switching a coupling pattern.

Figure 2:
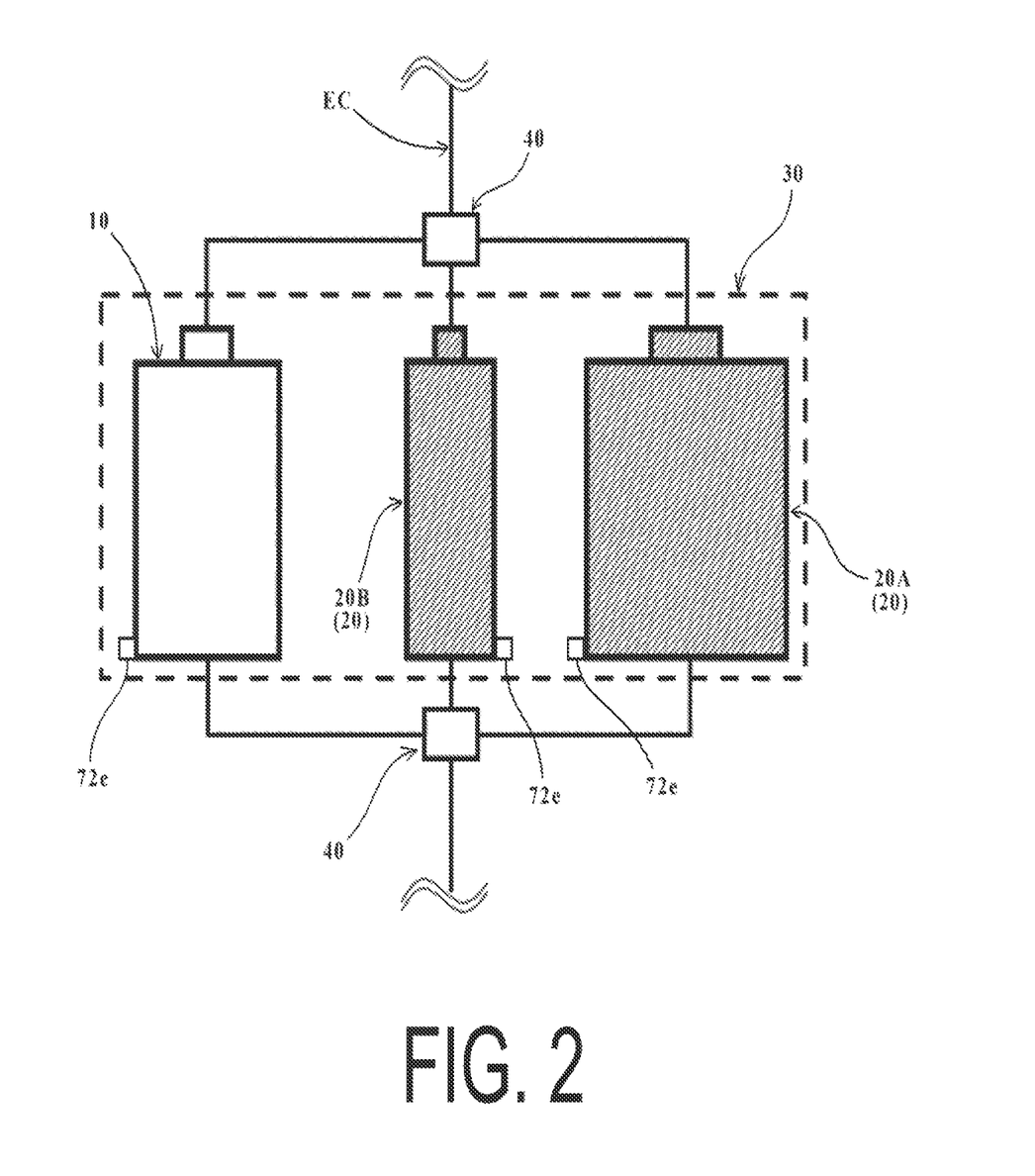
FIG. 2 is a schematic diagram illustrating a configuration example of the vehicle drive power storage device according to the embodiment of the disclosure.

As illustrated in FIG. 2 and others, the vehicle drive power storage device 30 includes a power battery pack 10 having higher power and a lower capacity than capacity battery packs 20, and at least two capacity battery packs 20. The two capacity battery packs 20 are coupled in parallel to the power battery pack 10 and have a higher capacity and lower power than the power battery pack 10.

Two packs of non-aqueous secondary batteries (lithium ion secondary batteries) having different characteristics will be described below as examples of the battery packs according to the present embodiment. However, another known secondary battery other than a non-aqueous secondary battery may be used as long as the characteristics (high power and high capacity) defined in the present embodiment can be satisfied. For example, one may be a pack of lithium ion secondary batteries and the other may be a pack of nickel hydride batteries.

As an example, the power battery pack 10 may be made up of one lithium ion secondary battery or multiple lithium ion secondary batteries coupled in series. Although a single battery is illustrated in the drawings, the power battery pack 10 may also be configured such that unit batteries (unit cells)

are coupled in series to obtain a voltage value used to drive the vehicle. Examples of the lithium ion secondary battery suitable for such a power battery pack 10 include a known high-power lithium ion secondary battery in which lithium titanate is used for the negative electrode. As a nonrestrictive example, in the case of the one or more lithium ion secondary batteries constituting the power battery pack 10 according to the present embodiment, lithium manganate is used as a positive electrode material, and lithium titanate is used as a negative electrode material.

As understood from FIG. 2 and others, the capacity battery packs 20 include a first capacity battery pack 20A and a second capacity battery pack 20B. The first capacity battery pack 20A and the second capacity battery pack 20B are coupled in parallel to the power battery pack 10 and have a higher capacity and lower power than the power battery pack 10. Although a single battery is illustrated as each capacity battery pack 20 in the drawings, each capacity battery pack 20 may also have a configuration in which batteries are coupled in series to obtain a voltage value used to drive the vehicle. Examples of the lithium ion secondary battery suitable for the capacity battery packs 20 include a known lithium ion secondary battery and a known high-capacity lithium ion secondary battery. In the known lithium ion secondary battery, a carbon-based material is used for the negative electrode. In the known high-capacity lithium ion secondary battery, a ternary positive electrode material (nickel, cobalt, lithium manganate) is used for the positive electrode. As a nonrestrictive example, in the case of the one or more lithium ion secondary batteries constituting each capacity battery pack 20 according to the present embodiment, lithium iron phosphate or a ternary positive electrode material (nickel, cobalt, lithium manganate) may be used as the positive electrode material. Alternatively, a known carbon-based material may be used as the negative electrode material.

As illustrated in FIG. 2, the first capacity battery pack 20A and the second capacity battery pack 20B coupled in parallel are also coupled in parallel to the power battery pack 10 so as to have different electric capacities. In the present embodiment, the first capacity battery pack 20A is configured to have at least a larger capacity than the second capacity battery pack 20B.

As described below, in the vehicle drive power storage device 30 according to the present embodiment, the second capacity battery pack 20B is configured to exclusively supply electric power to the power battery pack 10 without supplying electric power to the load 60. In other words, the second capacity battery pack 20B according to the present embodiment may be configured to serve as a battery dedicated to charging the power battery pack 10.

Furthermore, in the power battery pack 10 and the capacity battery packs 20 (the first capacity battery pack 20A and the second capacity battery pack 20B) constituting the vehicle drive power storage device 30 according to the present embodiment, the inter-terminal voltages may be adjusted such that upper limit voltages are substantially equal to each other. In other words, the numbers of batteries coupled in series in the power battery pack 10 and the capacity battery packs 20 are adjusted such that the inter-terminal voltages are equal to each other. As an example, in the vehicle drive power storage device 30 according to the present embodiment, the number of lithium ion secondary batteries coupled in series in each of the power battery pack 10 and the capacity battery packs 20 may be made different to achieve an upper limit voltage of 300 V.

1-2. Switch Mechanism

The switch mechanism 40 is configured to have a function of switching the coupling state of the vehicle drive power storage device 30. The switch mechanism 40 is not particularly limited, and a known switch such as a semiconductor switch or a mechanical switch may be used as long as the switch mechanism 40 performs the above-described function.

As a first example, the switch mechanism 40 according to the present embodiment is configured to have a function of electrically coupling one or more of the power battery pack 10 and the capacity battery packs 20 to the load 60, as illustrated in FIG. 2. As a second example, the switch mechanism 40 according to the present embodiment is configured to have a function of electrically coupling the second capacity battery pack 20B to the power battery pack 10.

Hereinafter, coupling patterns of the vehicle drive power storage device 30 implemented by the switch mechanism 40 according to the present embodiment will be described with reference to FIG. 3 to FIG. 5.

In the vehicle drive power storage device 30 according to the present embodiment, the power battery pack 10 and the capacity battery packs 20 described above are coupled via the switch mechanism 40 to a known electric circuit EC coupled to the load 60.

1-3. First Coupling Pattern

Figure 3:
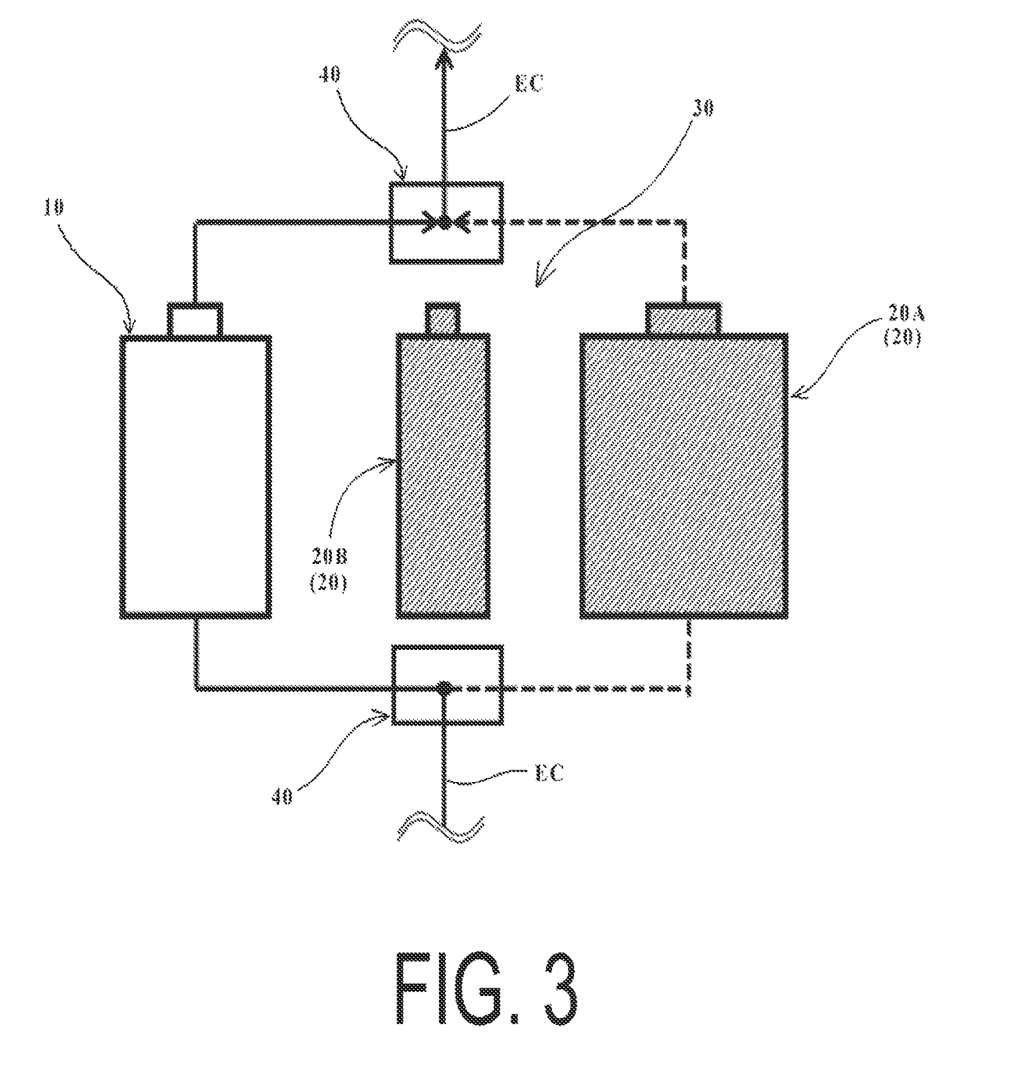
FIG. 3 is a schematic diagram illustrating a first coupling pattern of coupling the vehicle drive power storage device to a load.

FIG. 3 illustrates a first coupling pattern of the vehicle drive power storage device 30 implemented by the switch mechanism 40. As is clear from FIG. 3, in the first coupling pattern, the power battery pack 10 is mainly coupled to the load 60 of the vehicle 200. In this case, the switch mechanism 40 may couple the first capacity battery pack 20A to the load 60 in an auxiliary manner.

In other words, in the first coupling pattern, the switch mechanism 40 can achieve a mode in which the power battery pack 10 is singularly coupled to the load 60, a mode in which the first capacity battery pack 20A is singularly coupled to the load 60, and a mode in which the power battery pack 10 and the first capacity battery pack 20A are coupled in parallel to the load 60.

Examples of a travel environment in which the first coupling pattern is suitable include a case where the vehicle 200 travels while greatly accelerating or decelerating and a case where the vehicle 200 travels on an expressway while maintaining a relatively high velocity.

Note that a determination criterion for switching between the power battery pack 10 and the first capacity battery pack 20A to be coupled to the load 60 in the first coupling pattern may be set as required based on torque, fuel efficiency, or the like required of the vehicle 200. An example of performing switching based on the switching determination criterion is, after setting a rated output value of the first capacity battery pack 20A as a determination threshold value for switching, performing control of coupling the power battery pack 10 to the load 60 when required battery power exceeds the determination threshold value and performing control of coupling the first capacity battery pack 20A to the load 60 when the required battery power falls below the determination threshold value. Even when the power battery pack 10 is coupled to the load 60 based on such a determination threshold value, control may be performed to use the first capacity battery pack 20A in an auxiliary manner and couple the first capacity battery pack 20A in parallel to the load 60.

1-4. Second Coupling Pattern

Figure 4:
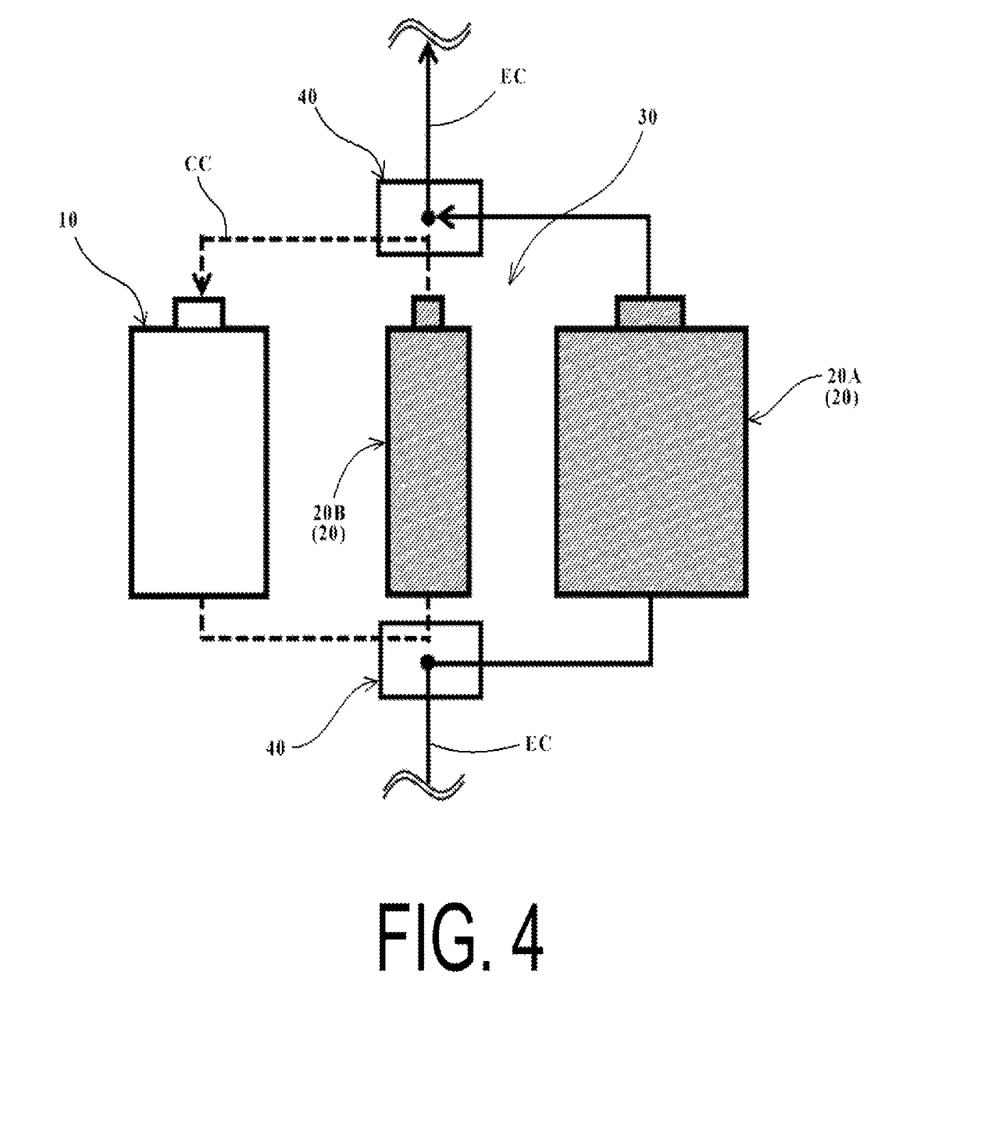
FIG. 4 is a schematic diagram illustrating a second coupling pattern of coupling the vehicle drive power storage device to the load.

FIG. 4 illustrates a second coupling pattern of the vehicle drive power storage device 30 implemented by the switch mechanism 40. As is clear from FIG. 4, in the second coupling pattern, the first capacity battery pack 20A is coupled to the load 60 of the vehicle 200 via the electric circuit EC. In this case, concurrently with the above, the switch mechanism 40 may perform control of coupling the second capacity battery pack 20B to the power battery pack 10 via a charging circuit CC and charging the power battery pack 10.

In other words, in the second coupling pattern, the switch mechanism 40 can achieve a mode in which the first capacity battery pack 20A is singularly coupled to the load 60 to supply electric power used for the load 60, and a mode in which the second capacity battery pack 20B is coupled to the power battery pack 10 to charge the power battery pack 10.

Examples of a travel environment in which the second coupling pattern is suitable include a case in which the vehicle 200 travels at a substantially constant velocity without greatly accelerating or decelerating, such as when traveling at a constant velocity on an expressway.

1-5. Third Coupling Pattern

Figure 5:
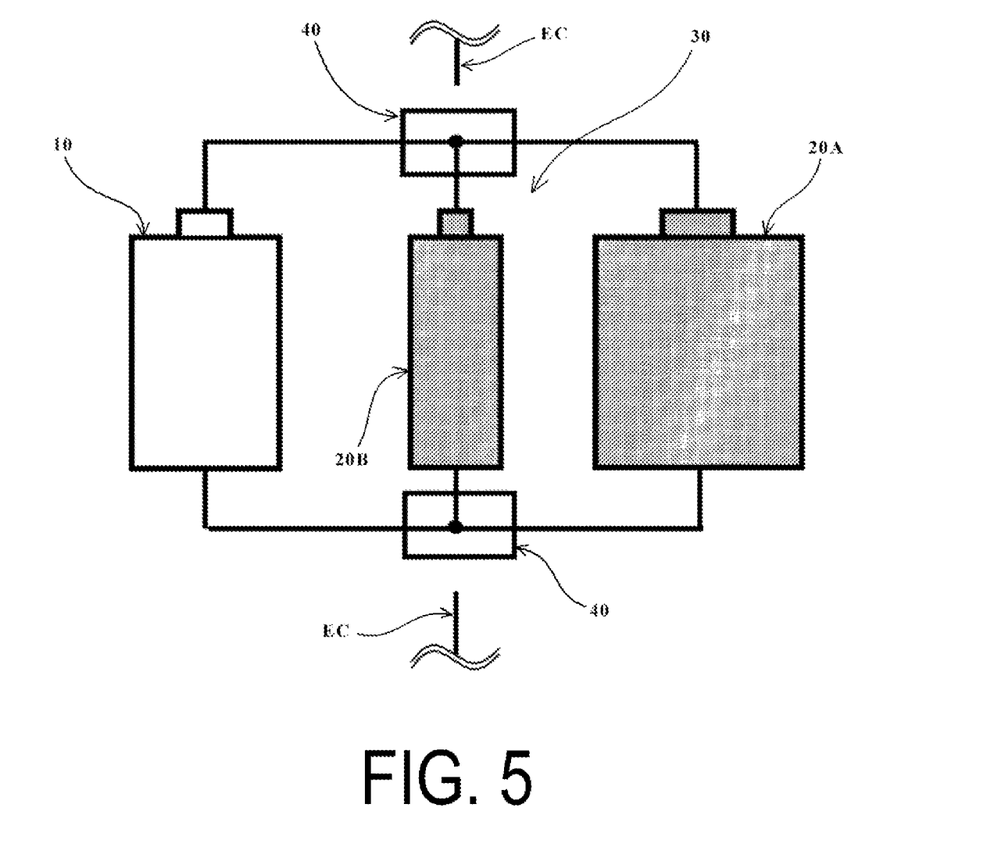
FIG. 5 is a schematic diagram illustrating a third coupling pattern of coupling the vehicle drive power storage device to the load.

FIG. 5 illustrates a third coupling pattern of the vehicle drive power storage device 30 implemented by the switch mechanism 40. As is clear from FIG. 5, in the third coupling pattern, the vehicle drive power storage device 30 is electrically separated from the load 60 of the vehicle 200 and the power battery pack 10 and the capacity battery packs 20 are electrically coupled to each other.

In other words, in the third coupling pattern, the switch mechanism 40 can achieve a mode in which the power battery pack 10, the first capacity battery pack 20A, and the second capacity battery pack 20B are coupled in parallel such that their voltages are balanced and made equal. By adopting the third coupling pattern, the vehicle drive power storage device 30 can minimize the occurrence of a battery having a very low voltage (that is, having a low state of charge SOC) and, for example, maintain a state in which the power battery pack 10 can be immediately used.

Examples of a travel environment in which the third coupling pattern is suitable include a case where the vehicle drive power storage device 30 does not supply electric power to the load 60, such as a case where the vehicle 200 is stopped.

In some embodiments, a state of travel in which the vehicle 200 slightly accelerates and then travels at less than the rated output of the battery continuing for a long period of time may give rise to a traveling condition of saving power of the power battery pack 10. In contrast, since the amount of power consumption during acceleration of the vehicle 200 is relatively large, it can be estimated that the state of charge of the power battery pack 10 is often lower than the state of charge of the first capacity battery pack 20A. On the other hand, adopting the third coupling pattern allows the in-vehicle electricity storage system 100 according to the present embodiment to make the voltages across the entire vehicle drive power storage device 30 uniform. This can achieve stable battery output even in a travel pattern in which the vehicle accelerates highly frequently or a travel pattern in which the vehicle continuously travels on a road with ups and downs for a long period of time, for example.

2-1. Detailed Configuration of Battery Control Device

Returning to FIG. 1, the in-vehicle electricity storage system 100 according to the present embodiment includes the vehicle drive power storage device 30, the switch mechanism 40, and a battery control device 50 (the battery control device 50 and the vehicle drive control device 70 (described below) are collectively referred to as a "control device"). The battery control device 50 controls the switch mechanism 40. The battery control device 50 may be configured to have a function of monitoring the state of charge (SOC) of the vehicle drive power storage device 30, or a function of controlling charging and discharging of the vehicle drive power storage device 30.

The battery control device 50 is also referred to as a battery management unit (BMU). The battery control device 50 includes, for example, one or more processors such as a central processing unit (CPU) and one or more memories such as a random access memory (RAM) or a read only memory (ROM). The one or more memories are communicably coupled to the one or more processors.

With this configuration, the one or more processors executes a computer program that causes the battery control device 50 to serve as a device that controls charging and discharging of the power battery pack 10 and the capacity battery packs 20 via the switch mechanism 40. The computer program is a computer program that causes the one or more processors to execute an operation (described below) to be executed by the battery control device 50. The computer program executed by the one or more processors may be recorded in a recording medium that serves as a storage unit (memory) provided in the battery control device 50. Alternatively, the computer program may be recorded in a recording medium incorporated in the battery control device 50 or any recording medium that can be externally attached to the battery control device 50.

The recording medium for recording the computer program may be a magnetic medium such as a hard disk, a floppy disk, or a magnetic tape, an optical recording medium such as a compact disk read only memory (CD-ROM), a digital versatile disk (DVD), or a Blu-ray (trade name), a magneto-optical medium such as a floptical disk, a memory device such as a RAM or a ROM, a flash memory such as a universal serial bus (USB) memory, a solid state drive (SSD), or another medium capable of storing the program.

In one example, the battery control device 50 according to the present embodiment includes a processing unit 50A and a storage unit 50B.

Figure 6:
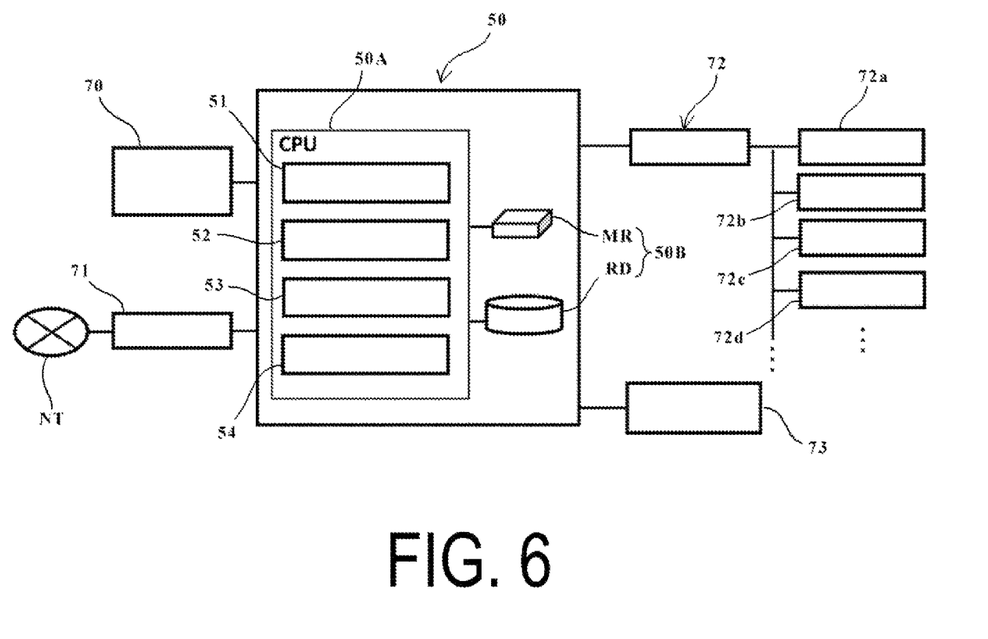
FIG. 6 is a functional block diagram of the vehicle including a control device according to the embodiment of the disclosure.

The processing unit 50A includes the above-described one or more processors such as a CPU and includes a battery state value acquisition unit 51, an SOC monitor 52, a switch controller 53, and a display controller 54, as illustrated in FIG. 6. Each unit included in the processing unit 50A is a function implemented by the above-described one or more processors executing the program. However, some of the battery state value acquisition unit 51, the SOC monitor 52, the switch controller 53, and the display controller 54 described above may be composed of known analog circuits.

The processing unit 50A may be configured to communicate with the vehicle drive control device 70 configured of another known in-vehicle ECU or the like. The vehicle drive control device 70 may further have a function of controlling driving of the battery control device 50 according to the present embodiment based on, for example, detection values of a vehicle velocity sensor 72d and known vehicle state sensors. The known vehicle state sensors include an acceleration sensor, an angular velocity sensor, a steering angle sensor, an accelerator pedal sensor, and a brake pedal sensor, which are not illustrated. Further, the processing unit 50A may be configured to communicate information with a known external network NET, such as the Internet, via a known in-vehicle communication device 71.

The storage unit 50B may include a known memory MR such as a RAM that temporarily stores information and a known recording device RD such as a hard disk HDD or SSD that can store the program and the like. The storage unit 50B according to the present embodiment may store information such as acquired data and data of a calculation result, in addition to the program to be executed by the processing unit 50A and various parameters to be used for execution of the program.

Now, the battery state value acquisition unit 51, the SOC monitor 52, the switch controller 53, and the display controller 54 in the processing unit 50A will be described.

2-2. Battery State Value Acquisition Unit

The battery state value acquisition unit 51 can execute processing of acquiring a state value (in one example, information related to a current value and a voltage value) of the vehicle drive power storage device 30 installed in the vehicle 200. In one example, the battery state value acquisition unit 51 has a function of detecting the state values (voltage value and current value) of the vehicle drive power storage device 30 of the vehicle 200 while traveling or when at a stop by a known current sensor 72a and a known voltage sensor 72b. The current sensor 72a and the voltage sensor 72b are provided in the vehicle drive power storage device 30.

2-3. SOC Monitor

The SOC monitor 52 executes processing of detecting and monitoring the state of charge (SOC) of each battery pack of the vehicle drive power storage device 30 (the power battery pack 10 and the capacity battery packs 20) installed in the vehicle 200 by the in-vehicle current sensor 72a and the in-vehicle voltage sensor 72b. The method of detecting the SOC by the SOC monitor 52 is not particularly limited, and any method can be used as long as the method does not depart from the gist of the present embodiment. For example, various known SOC estimation techniques such as those described in JP-A No. 2021-68637 and International Publication No. WO 2019/193471 may be applied.

2-4. Switch Controller

The switch controller 53 executes processing of switching the above-described coupling pattern of coupling the vehicle drive power storage device 30 to the load 60. For example, the switch controller 53 may execute processing of switching between the first coupling pattern illustrated in FIG. 3, the second coupling pattern illustrated in FIG. 4, and the third coupling pattern illustrated in FIG. 5 via the switch mechanism 40 described above.

In one example, when the vehicle 200 accelerates, the switch controller 53 according to the present embodiment can apply the first coupling pattern to the load 60 to preferentially supply electric power from the power battery pack 10. When the vehicle 200 decelerates, the switch controller 53 may apply the first coupling pattern to the load 60 to electrically couple the power battery pack 10 and the load 60. The switch controller 53 may determine whether the vehicle 200 is accelerating by, for example, a known calculation method based on the vehicle velocity value acquired by the above-described vehicle velocity sensor 72d, or based on the vehicle acceleration value acquired by the above-described vehicle acceleration sensor.

When the velocity of the vehicle 200 is constant, the switch controller 53 can apply the second coupling pattern described above to supply electric power from the second capacity battery pack 20B to the power battery pack 10, concurrently with supplying electric power from the first capacity battery pack 20A to the load 60.

Furthermore, when the vehicle 200 is stopped, the switch controller 53 can apply the third coupling pattern described above to balance the voltages of the power battery pack 10, the first capacity battery pack 20A, and the second capacity battery pack 20B. At this time, the switch controller 53 can perform control of charging the power battery pack 10 by supplying electric power from the second capacity battery pack 20B to the power battery pack 10 without supplying electric power from the second capacity battery pack 20B to the load 60.

Additionally, the switch controller 53 may perform control of supplying electric power from the power battery pack 10 to the load 60 without supplying electric power from the first capacity battery pack 20A to the load 60, based on detected battery temperatures of the first capacity battery pack 20A and the second capacity battery pack 20B. In one example, when electric power is supplied from the first capacity battery pack 20A to the load 60 based on the above-described second coupling pattern and the vehicle has continuously traveled at a constant velocity (e.g., a high velocity) for a long period of time, the capacity battery packs 20 are expected to have a high battery temperature.

In such a case, the switch controller 53 can switch the coupling from the second coupling pattern to the first coupling pattern such that electric power is temporarily supplied from the power battery pack 10 to the load 60 and not supplied from the first capacity battery pack 20A to the load 60, which can suppress deterioration of the capacity battery packs 20.

Note that the battery temperatures of the power battery pack 10 and the capacity battery packs 20 can be detected by known battery temperature sensors 72e mounted on the respective battery packs (sec FIG. 2).

2-5. Display Controller

The display controller 54 executes processing of displaying, on a display device 73, various types of information including the coupling state of the vehicle drive power storage device 30 to the load 60. A known in-vehicle display can be used as an example of the display device 73 according to the present embodiment. The display controller 54 may output audio corresponding to the above-described various types of information from an in-vehicle speaker or may display the information on an external terminal such as a smartphone held by an occupant of the vehicle.

2-6. Computer Program and Recording Medium

The computer program for implementing each function of the above-described processing unit 50A is a computer program applied to the vehicle drive power storage device.

In the vehicle drive power storage device, the power battery pack and the at least two capacity battery packs including the first capacity battery pack and the second capacity battery pack are installed in the vehicle and coupled in parallel. The at least two capacity battery packs have a higher capacity and lower power than the power battery pack. The computer program causes the one or more processors to perform processing including acquiring one or more of the velocity and the acceleration of the vehicle, preferentially supplying electric power from the power battery pack to the load when the vehicle accelerates, and when the velocity of the vehicle is constant, supplying electric power from the second capacity battery pack to the power battery pack, concurrently with supplying electric power from the first capacity battery pack to the load. Such a computer program may be stored in, for example, the above-described known recording medium or downloaded from a known server such as a cloud to the vehicle 200.

3-1. Other In-vehicle Equipment

The vehicle 200 according to the present embodiment may further include the vehicle drive control device 70 that controls the load 60, the above-described generator, and the like in cooperation with the battery control device 50.

Such a vehicle drive control device 70 is configured to have a function of controlling driving of the vehicle 200 based on state information of the vehicle 200 detected by a sensor group 72 installed in the vehicle 200, for example. The vehicle drive control device 70 includes one or more processors such as a central processing unit (CPU) and one or more memories such as a random access memory (RAM) or a read only memory (ROM) communicably coupled to the one or more processors.

Such vehicle state sensors are devices that measures information indicating behavior and an operating state of the vehicle 200. As an example, the vehicle state sensors belong to the sensor group 72 according to the present embodiment and may include the vehicle velocity sensor 72d, a known acceleration sensor, and a known angular velocity sensor. The vehicle state sensors may also include a known steering angle sensor, a known accelerator pedal sensor, and a known brake pedal sensor.

The vehicle drive control device 70 may be configured to have a function of controlling driving of the vehicle 200 based on position information detected by a vehicle position information sensor 72c installed in the vehicle 200. The vehicle position information sensor 72c may be, for example, a known global positioning system (GPS) sensor. In the present embodiment, a GPS sensor is used as the vehicle position information sensor 72c. However, the vehicle position information sensor 72c is not limited to this example and may be equipment that receives a satellite signal from another satellite system that identifies the position of the vehicle 200.

4-1. Method of Controlling In-vehicle Electricity Storage System

Figure 7:
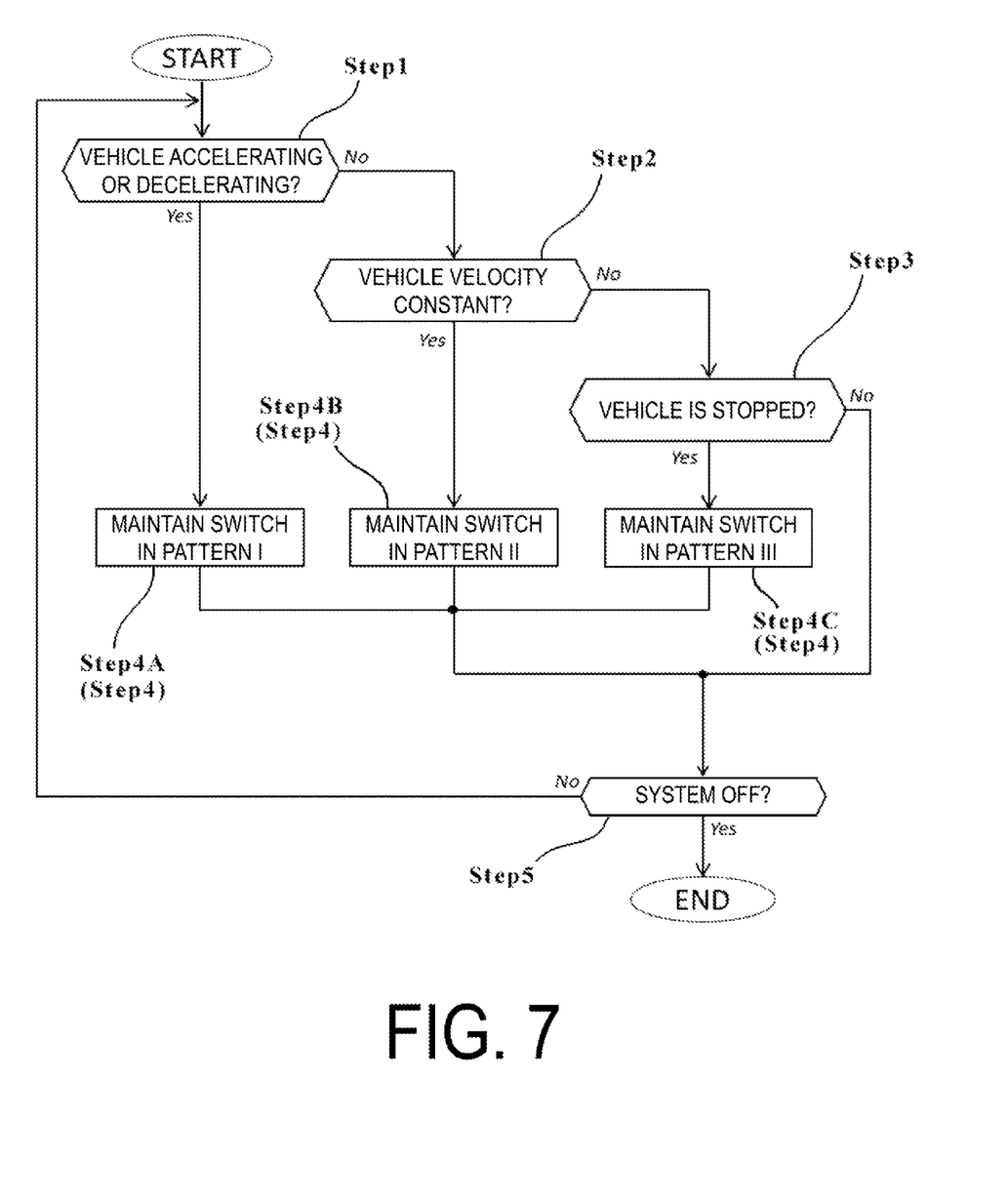
FIG. 7 is a flowchart illustrating a method of controlling the vehicle drive power storage device performed by the control device according to the embodiment of the disclosure.

Next, an example of a method of controlling the in-vehicle electricity storage system 100 including the vehicle drive power storage device 30 according to the present embodiment will be described with reference to FIG. 7. Note that the control method may be used as an algorithm of the above-described program. The program having such an algorithm can be distributed in a downloadable manner via a known network or distributed in the form of being stored in a recording medium.

In the following description, for example, the user gets in the vehicle 200 and activates the system power supply to start traveling.

First, in step 1, the control device (the battery control device 50 or the vehicle drive control device 70) determines whether the traveling vehicle 200 is accelerating or decelerating by using the vehicle velocity sensor 72d, the acceleration sensor, or the like described above. When it is determined in step 1 that the traveling vehicle 200 is neither accelerating nor decelerating, the processing proceeds to step 2 described below.

On the other hand, when it is determined in step 1 that the traveling vehicle 200 is accelerating or decelerating, the processing proceeds to step 4A where the control device applies the first coupling pattern (pattern I in FIG. 7) via the switch mechanism 40 to electrically couple the load 60 and the vehicle drive power storage device 30. As a result, electric power is supplied to the load 60 preferentially from the power battery pack 10 of the vehicle drive power storage device 30. At this time, electric power may be supplied to the load 60 using the first capacity battery pack 20A in an auxiliary manner.

When it is determined in step 1 that the traveling vehicle 200 is neither accelerating nor decelerating, the control device determines in subsequent step 2 whether the velocity of the traveling vehicle 200 is constant by using the vehicle velocity sensor 72d, the acceleration sensor, or the like. When it is determined in step 2 that the velocity of the traveling vehicle 200 is not constant, the processing then proceeds to step 3 described below. Note that the determination criterion regarding whether the vehicle velocity is constant used in step 2 is not necessarily just one velocity value. For example, the determination criterion may be whether a range of the vehicle velocity measured within a predetermined determination time period is within ±5 km/h with respect to the average value within that time period.

On the other hand, when it is determined in step 2 that the velocity of the traveling vehicle 200 is constant, the processing proceeds to step 4B where the control device applies the second coupling pattern (pattern II in FIG. 7) via the switch mechanism 40 to electrically couple the load 60 and the vehicle drive power storage device 30. As a result, electric power is supplied to the load 60 from the first capacity battery pack 20A of the vehicle drive power storage device 30. Also, electric power is supplied (charged) to the power battery pack 10 from the second capacity battery pack 20B.

When it is determined in step 2 that the velocity of the traveling vehicle 200 is not constant, the control device determines in subsequent step 3 whether the vehicle 200 is stopped by using the vehicle velocity sensor 72d, the acceleration sensor, or the like. When it is determined in step 3 that the vehicle 200 is not stopped, the processing proceeds to step 5 described below.

On the other hand, when it is determined in step 3 that the vehicle 200 is stopped, the processing proceeds to step 4C where the control device applies the third coupling pattern (pattern III in FIG. 7) via the switch mechanism 40 to electrically decouple the vehicle drive power storage device 30 from the load 60 and balances the voltages in the vehicle drive power storage device 30. As a result, the power battery pack 10, the first capacity battery pack 20A, and the second capacity battery pack 20B have substantially equal voltage values and states of charge SOC. Thus, coupling patterns suitable for various subsequent travel environments can be applied by the switch mechanism 40.

After steps 4A, 4B and 4C, it is determined in subsequent step 5 whether the system of the vehicle 200 is off. In step 5, if the system of the vehicle 200 is off, the control method according to the present embodiment ends. When the system of the vehicle 200 is not off, the processing returns to step 1 and the above-described processing is repeated.

As described above, the vehicle 200 including the in-vehicle electricity storage system 100 according to the embodiment of the disclosure is equipped with the vehicle drive power storage device. In the vehicle drive power storage device, the power battery pack and the at least two capacity battery packs including the first capacity battery pack and the second capacity battery pack are coupled in parallel. The at least two capacity battery packs have a higher capacity and lower power than the power battery pack. The control device for controlling the vehicle drive power storage device can preferentially supply electric power from the power battery pack to the load when the vehicle accelerates under a predetermined condition (rapid charging/discharging), for example. Also, the control device can supply electric power from the second capacity battery pack to the power battery pack, concurrently with supplying electric power from the first capacity battery pack to the load, when the vehicle velocity is constant. This makes it possible to achieve stable battery output even in a travel environment in which the vehicle frequently repeats acceleration, for example.

A preferred embodiment of the disclosure has been described above with reference to the accompanying drawings, but the disclosure is not limited to the example. It is apparent to those skilled in the art with common knowledge in the technical field of the disclosure that various variations and modifications may be conceived within the scope of the technical ideas described in the claims. Thus, it is acknowledged that those variations and modifications are also naturally included in the technical scope of the disclosure.

For example, in the embodiment of the disclosure, a non-aqueous electrolyte secondary battery (e.g., a lithium ion secondary battery) is described as an example of each of the power battery pack and the capacity battery pack for driving the in-vehicle load 60. However, known secondary batteries other than the non-aqueous electrolyte secondary battery, such as a nickel hydride battery or a lead-acid battery, may be used for each of the battery packs according to the embodiment of the disclosure.

The invention claimed is:

1. A vehicle comprising:
a vehicle drive power storage device comprising a power battery pack and at least two capacity battery packs comprising a first capacity battery pack and a second capacity battery pack, and temperature sensors configured to detect battery temperatures of the power battery pack and the at least two capacity battery packs, the power battery pack and the at least two capacity battery packs being coupled in parallel, the at least two capacity battery packs having a higher capacity and lower power than the power battery pack;
a switch mechanism configured to switch a coupling state of the vehicle drive power storage device;
a control device configured to control charging and discharging of the vehicle drive power storage device via the switch mechanism; and
a load configured to be driven and controlled by the control device, wherein
the second capacity battery pack is configured to have at least a smaller capacity than the first capacity battery pack and exclusively supply electric power to the power battery pack without supplying electric power to the load, and
the control device is configured to
(a) supply electric power from the power battery pack to the load when the vehicle accelerates, and
(b) when a velocity of the vehicle is constant, exclusively supply electric power from the second capacity battery pack to the power battery pack without supplying electric power from the second capacity battery pack to the load, concurrently with supplying electric power from the first capacity battery pack to the load.

2. The vehicle according to claim 1, wherein
the control device is configured to
(c) balance voltages of the power battery pack, the first capacity battery pack, and the second capacity battery pack when the vehicle is stopped.

3. The vehicle according to claim 1, wherein
the control device is configured to perform control of supplying electric power from the power battery pack to the load without supplying electric power from the first capacity battery pack to the load, based on battery temperatures detected from the first capacity battery pack and the second capacity battery pack.

4. The vehicle according to claim 2, wherein
the control device is configured to perform control of supplying electric power from the power battery pack to the load without supplying electric power from the first capacity battery pack to the load, based on battery temperatures detected from the first capacity battery pack and the second capacity battery pack.

5. A recording medium storing a computer program applied to a vehicle drive power storage device comprising a power battery pack and at least two capacity battery packs comprising a first capacity battery pack and a second capacity battery pack, and temperature sensors configured to detect battery temperatures of the power battery pack and the at least two capacity battery packs, the power battery pack and the at least two capacity battery packs being installed in a vehicle and coupled in parallel, the at least two capacity battery packs having a higher capacity and lower power than the power battery pack, the second capacity battery pack being configured to have at least a smaller capacity than the first capacity battery pack and exclusively supply electric power to the power battery pack without supplying electric power to a load, the computer program causing one or more processors to perform processing comprising:
acquiring one or both of a velocity and an acceleration of the vehicle;
supplying electric power from the power battery pack to the load when the vehicle accelerates; and
when the velocity of the vehicle is constant, exclusively supplying electric power from the second capacity battery pack to the power battery pack without supplying electric power from the second capacity battery pack to the load, concurrently with supplying electric power from the first capacity battery pack to the load.

6. A vehicle comprising:
a vehicle drive power storage device comprising a power battery pack and at least two capacity battery packs comprising a first capacity battery pack and a second capacity battery pack, and temperature sensors configured to detect battery temperatures of the power battery pack and the at least two capacity battery packs, the power battery pack and the at least two capacity battery packs being coupled in parallel, the at least two capacity battery packs having a higher capacity and lower power than the power battery pack;

a switch mechanism configured to switch a coupling state of the vehicle drive power storage device;

circuitry configured to control charging and discharging of the vehicle drive power storage device via the switch mechanism; and a load configured to be driven and controlled by the circuitry, wherein the second capacity battery pack is configured to have at least a smaller capacity than the first capacity battery pack and exclusively supply electric power to the power battery pack without supplying electric power to the load, and the circuitry is configured to (a) supply electric power from the power battery pack to the load when the vehicle accelerates, and (b) when a velocity of the vehicle is constant, exclusively supply electric power from the second capacity battery pack to the power battery pack without supplying electric power from the second capacity battery pack to the load, concurrently with supplying electric power from the first capacity battery pack to the load.

* * * * *